US012564482B1

(12) United States Patent (10) Patent No.: US 12,564,482 B1
Alanazi et al. (45) Date of Patent: Mar. 3, 2026

(54) HANDHELD VISE FOR DENTAL CROWNS

(71) Applicant: KING SAUD UNIVERSITY, Riyadh (SA)

(72) Inventors: Khalid Jamal Alanazi, Riyadh (SA); Mansour Hamad Alaskar, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/269,563

(22) Filed: Jul. 15, 2025

Related U.S. Application Data

(62) Division of application No. 19/186,982, filed on Apr. 23, 2025.

(51) Int. Cl.
| | |
|---|---|
| *A61C 13/12* | (2006.01) |
| *A61C 3/00* | (2006.01) |
| *A61C 3/16* | (2006.01) |
| *B25B 1/00* | (2006.01) |
| *B25B 3/00* | (2006.01) |

(52) U.S. Cl.
CPC ................ *A61C 13/12* (2013.01); *A61C 3/16* (2013.01); *A61C 3/00* (2013.01); *B25B 1/00* (2013.01); *B25B 3/00* (2013.01)

(58) Field of Classification Search
CPC .... A61C 3/00; A61C 3/14; A61C 3/16; A61C 13/0028; A61C 13/0027; A61C 13/1016; A61C 13/12; A61C 19/10; A61C 19/006; A61C 19/008
See application file for complete search history.

(56) References Cited

U.S. PATENT DOCUMENTS 3,704,879 A * 12/1972 Nishikawa ................ B25B 1/18
269/224
4,594,069 A 6/1986 Thompson
(Continued)

FOREIGN PATENT DOCUMENTS

| CN | 207616259 U | 7/2018 | |
| CN | 115444588 | * 12/2022 | |
| CN | 115444588 A | * 12/2022 | ............... A61B 1/04 |

OTHER PUBLICATIONS

Machine Translation of CN115444588. Obtained via EPO website on Sep. 11, 2025 (Year: 2022).*
(Continued)

*Primary Examiner* — Edward Moran
(74) *Attorney, Agent, or Firm* — Nath, Goldberg & Meyer; Joshua B. Goldberg

(57) ABSTRACT

A handheld vise for dental crowns includes a vise block, an elongated handle extending from the vise block, a linear screw embedded in the vise block, and first and second jaws. The second jaw may be arcuate on a gripping surface thereof to conform to the shape of a dental crown. The handheld vise is sized for quickly and readily securing a dental crown such as a stainless-steel dental crown for use in pediatric dentistry. An elastomeric material may be used on the gripping surfaces of the vise. A radius of curvature of the gripping surface of the second jaw may be between about 25-35 mm. A height of the jaws may be between about 2-5 mm, and a distance between the first jaw and a vertex of the second jaw may range from about 3-10 mm. A method and kit for forming crowns including the handheld vise are disclosed.

2 Claims, 3 Drawing Sheets

(56) References Cited

U.S. PATENT DOCUMENTS

| | | | |
|---|---|---|---|
| D718,599 | S | 12/2014 | Durocher et al. |
| 9,393,089 | B1 | 7/2016 | Al-Shehri |
| 12,059,320 | B1 | 8/2024 | Alangari |
| 2018/0110599 | A1* | 4/2018 | Woldegergis .......... B25B 1/241 |

OTHER PUBLICATIONS

Henry Schein Dental Catalog 2020. Accessed via nxtbook.com/nxtbooks/henryschein/merchandise2020/index.php?startid=289#/p/288 (Year: 2020).*
Hand-Held Engraving Pin Vise; printed on Jan. 23, 2025.
Detail Hand Vise; printed on Jan. 23, 2025.
DSPIAE—AT-HV Hand-Held Mini Vise; printed on Jan. 23, 2025.
7" Jeweler's Adjustable Hand Vise; printed on Jan. 23, 2025.
Vicegrip Curved Jaw 250MM FB—Bottom Jaw Curved / Top Jaw Straight; printed on Jan. 23, 2025.

* cited by examiner

HANDHELD VISE FOR DENTAL CROWNS

CROSS-REFERENCE TO RELATED APPLICATION

This application is a divisional of U.S. patent application Ser. No. 19/186,982, filed on Apr. 23, 2025, the entire contents of which are incorporated herein by reference.

BACKGROUND OF THE INVENTION

Field of the Invention

The disclosure of the present patent application relates to dentistry, and particularly to a handheld vise designed for holding dental crowns while trimming and shaping.

Description of Related Art

Dental crowns are widely used in pediatric dentistry to restore primary teeth affected by decay, fractures, or developmental defects. Stainless steel crowns (SSCs) are often a preferred choice due to their durability, ease of placement, and cost-effectiveness. However, prefabricated SSCs often require modification before cementation to ensure proper fit, comfort, and function in a child's mouth. Adjustments typically involve trimming excess material from the crown's base margin to achieve a secure fit while preventing gingival irritation and ensuring proper occlusal contact.

Currently, the process of modifying SSCs is by a dental practitioner holding the small, slippery crown with their fingers while shaping it with scissors, pliers, or rotary tools, which leads to challenges in control, precision, and safety. This method increases the risk of accidental injury, crown deformation, or improper fit, which can compromise the restoration's longevity and comfort for the patient.

The currently available tools for holding a dental crown are not designed specifically to hold dental crowns, and are thus hard to use for that purpose. For such reasons, a handheld vise for holding dental crowns solving the aforementioned problems is desired.

SUMMARY OF THE INVENTION

To address the limitations of the prior art, a handheld vise specifically designed to hold and stabilize dental crowns during shaping and trimming is provided by the present disclosure, thus allowing for greater precision, improved safety, and enhanced efficiency in modifying dental crowns. By securely and readily clamping the crown in place, the vise enables more controlled adjustments when using cutting tools, thereby reducing hand fatigue and improving the overall quality of crown modifications.

The handheld vise of the present disclosure allows for holding and shaping dental crowns as are often used in pediatric dentistry. The vise ensures stable and consistent handling of the crown, allowing for efficient trimming and contouring before cementation. By simplifying the modification process, the vise enhances both the accuracy of crown preparation and the overall experience for the dental professional and pediatric patient.

In an embodiment, the handheld vise for dental crowns includes a vise block having an upper surface, side surfaces, and a bottom surface. An elongated handle extends from the bottom surface of the vise block, and a linear screw is embedded in the vise block. Means for rotating the linear screw are included on the vise block, and first and second jaws are included on an upper surface of the vise block. At least one of the jaws is movable on the upper surface of the vise block and is coupled to the linear screw such that the at least one jaw moves axially over the length of the linear screw upon rotation of the linear screw. The movable jaw may include an arcuate gripping surface for enhanced gripping of a dental crown. In an embodiment, the movable jaw is the second jaw, which includes first and second ends extending towards the first jaw. In an embodiment, the entire second jaw is arcuate in shape.

In an embodiment, gripping surfaces of the first jaw and/or second jaw may include an elastomeric layer thereon. The second jaw may be flexible such that it adapts to the contours of the dental crown when gripping a dental crown in a secured position.

In an embodiment, the upper surface of the vise block may include an elastomeric layer thereon. A height of the first jaw member and second jaw member may be between about 2-5 mm. The second jaw, when in an unclamped resting position, may have a radius of curvature of about 25-35 mm. A vertex point of the gripping surface of the second jaw may be orthogonally spaced from the first jaw by a distance range of about 3-10 mm.

In another embodiment, a method of shaping dental crowns using a handheld vise is provided. The method includes gripping an elongate handle extending from a bottom surface of a vise block of the handheld vise. A crown, such as for example a stainless-steel crown, is secured between first and second jaws of the handheld vise such that a top occlusal surface of the crown faces towards a top surface of the vise block of the handheld vise, and a bottom surface of the crown faces away from the handheld vise. The crown is secured between the first and second jaws by rotating a linear screw embedded in the vise block, thereby moving the second jaw until the crown is securely held between the second jaw and the first jaw. The second jaw is curved along its length for enhanced gripping of the crown. Material is removed from the base of the crown using cutting or shaping instruments to form a prepared crown.

In another embodiment, a kit for installing dental crowns is provided, including a handheld vise for holding dental crowns during the shaping or cutting of the crown. The handheld vise may be paired with a plurality of dental crowns, which may be of various sizes, and/or at least one instrument configured for shaping or cutting dental crowns.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Definitions

Figures 1A, 1B:
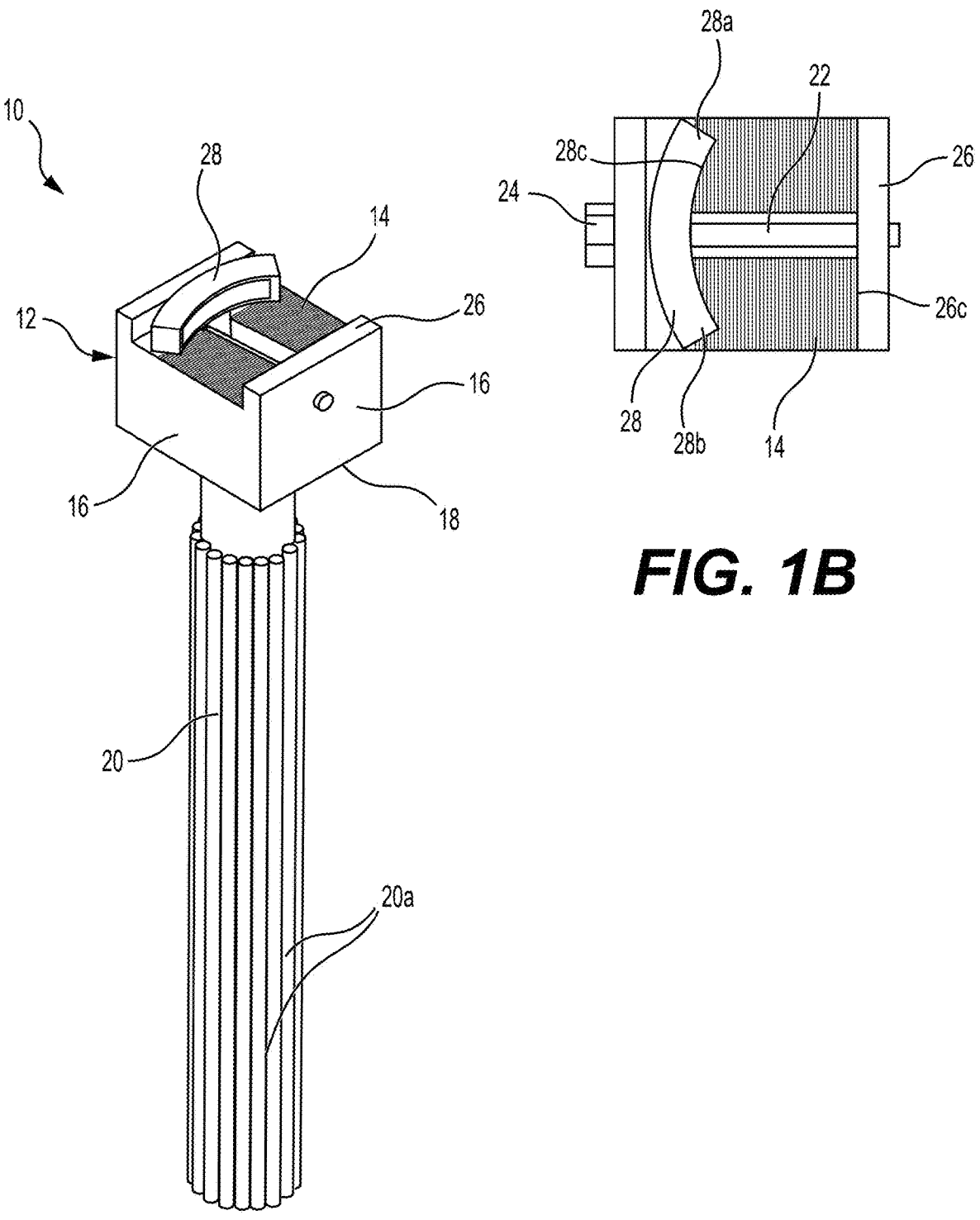
FIG. 1A is a perspective view of a handheld vise for shaping dental crowns.
FIG. 1B is a top view of a handheld vise for shaping dental crowns.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Referring to FIGS. 1A-B, a handheld vise 10 for dental crowns is shown. The handheld vise 10 includes a vise block 12 having an upper surface 14, side surfaces 16, and a bottom surface 18. An elongated handle 20, which may be columnar as shown, extends from the bottom surface 18 of the vise block 12. Elongated handle 20 may have ergonomic gripping features 20a formed therein. A linear screw drive is embedded in the vise block 12 including a linear screw 22, as well as means 24 for rotating the linear screw 22. Means 24 is shown as a hexagonal head attached to the linear screw 22, and could be rotated by hand or by tool, but other example means 24 for rotation of the linear screw 22 might include wing extensions, t-handle, thumbscrew, or lever handle, to name just a few other examples.

A first jaw 26 and second jaw 28 are included on the upper surface 14 of the vise block 12. The second jaw 28 is movable and is coupled to the linear screw 22 by a nut (not shown), such that the second jaw 28 moves axially over the length of the linear screw 22 upon rotation of the linear screw 22 through means 24. Second jaw 28 may be coupled to linear screw 22 through any suitable type of nut known in the art of vises such as, for example, a plain nut or a ball nut.

The second jaw 28 includes first end 28a and second end 28b that extend towards the first jaw 26. Second jaw 28 and first jaw 26 include respective contact surfaces 28c and 26c. Contact surface 28c is arcuate in shape for enhanced gripping of a dental crown. As shown, the entire second jaw 28 may be arcuate in shape for flexibility and enhanced gripping of a dental crown. Contact surfaces 28c, 26c, and/or upper surface 14 of vise block 12 may include an elastomeric layer thereon for enhanced gripping of a dental crown. The elastomeric layer may be, by non-limiting example, medical-grade silicone or thermoplastic elastomers. Second jaw 28 may be flexible along its length and in particular at ends 28a, 28b such that second jaw 28 adapts to the contours of a dental crown when the dental crown is secured between the first jaw 26 and second jaw 28.

Figure 2A:
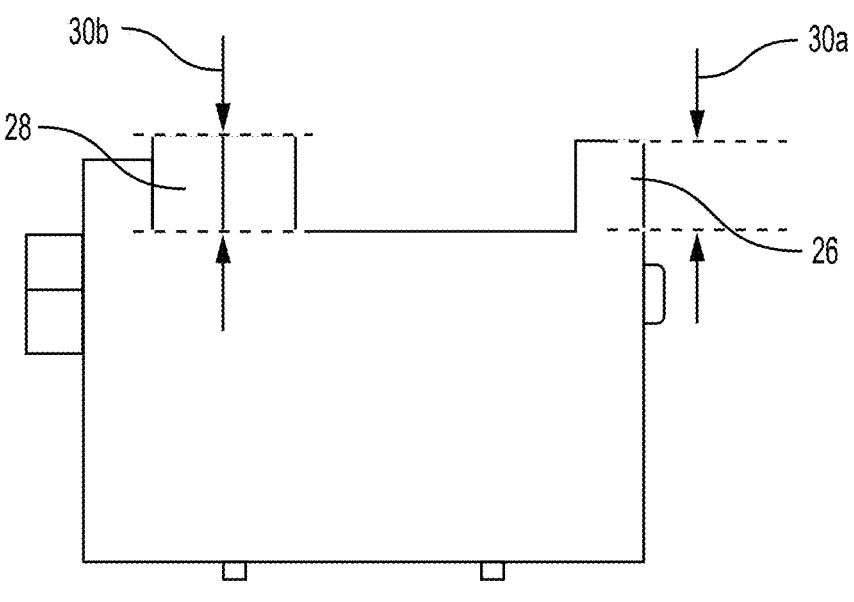
FIG. 2A is a side view of a vise block for shaping dental crowns.
Figure 2B:
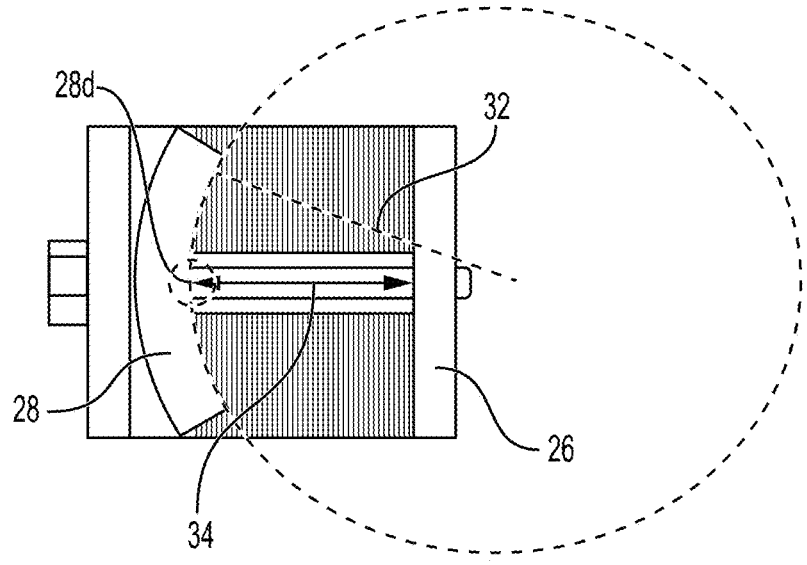
FIG. 2B is a top view of a vise block for shaping dental crowns.

Turning to FIGS. 2A-B, a height 30a of the first jaw and a height 30b of the second jaw may be about 2-5 mm. The second jaw 28, when in an unclamped (i.e. unflexed) resting position, may have a radius of curvature 32 of about 25-35 mm. A vertex point 28d of the second jaw 28 is orthogonally spaced from the first jaw 26 by a distance 34 ranging from about 3-10 mm. Distance 34 represents an operating range of motion for the second jaw 28 in relation to first jaw 26.

The distances described in FIGS. 2A-B are chosen so as to be close in sizing to typical sizes of pediatric dental crowns, thereby allowing fast placement of such crowns between first and second jaws 28 and 26 and quick tightening of the jaws to secure the crown therein.

Pediatric dental crowns, such as stainless-steel dental crowns, vary in size and are often numbered in size ranges of, for example, 2-7. These typical sizes (2-7) correspond to specific mesiodistal widths, or the width from the front to the back of the crown. These sizes help dentists choose the appropriate crown to fit a child's tooth, such as a primary molar. While stainless-steel dental crowns are one intended type of crown to be used by the disclosed handheld vise, other types of crowns could also potentially be used, including crowns of other metals such as nickel-chromium, cobalt-chromium, gold, and palladium, to name a few examples.

Figures 3A, 3B:
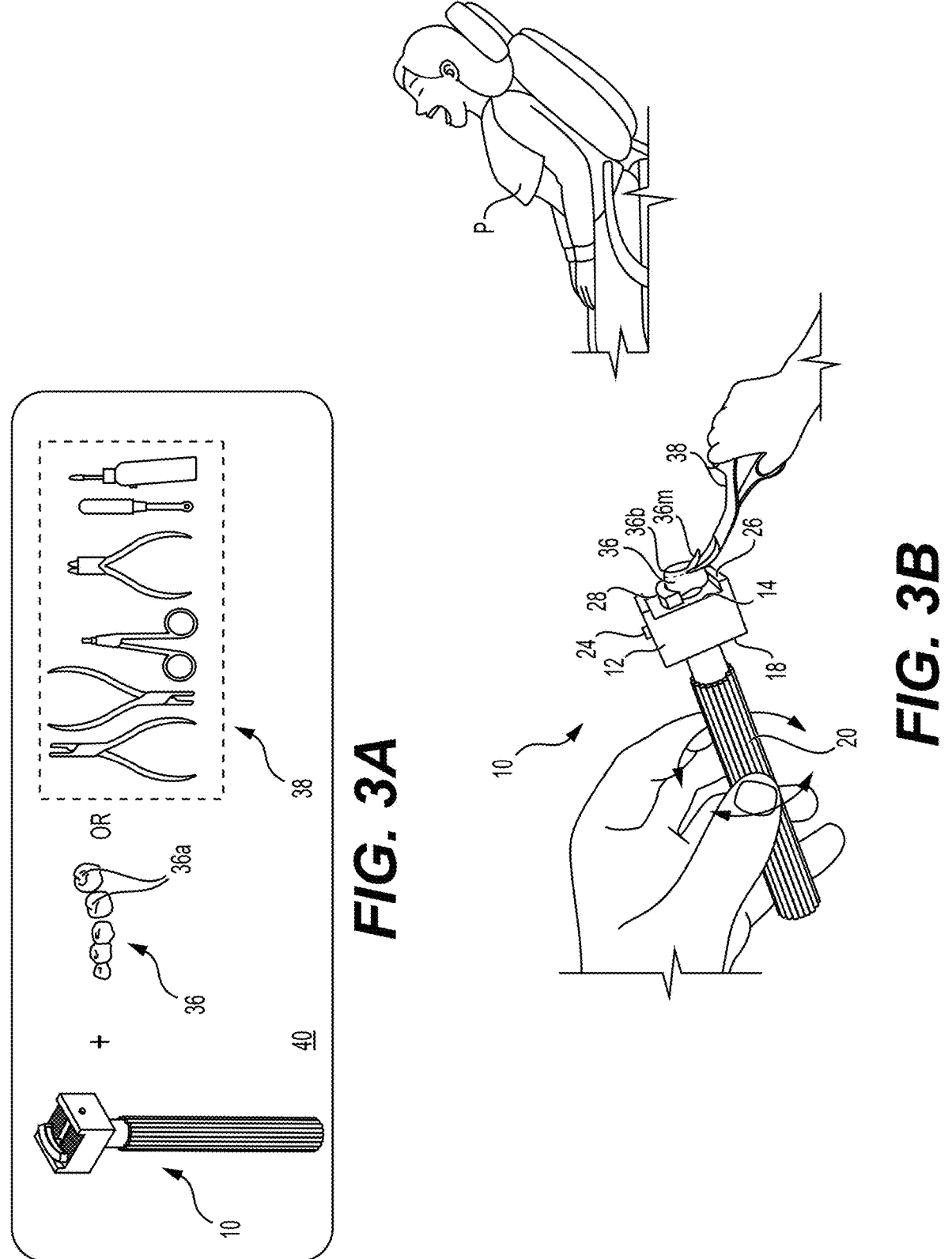
FIG. 3A is a perspective view of a kit for holding and shaping dental crowns.
FIG. 3B is an environmental perspective view of a method of holding and shaping dental crowns.

Referring now to FIGS. 3A-B, a kit and method for shaping dental crowns according to the present disclosure is illustrated. A number of dental crowns 36 may be provided in a variety of sizes for placement in the mouth of a patient P, such as a pediatric patient. The handheld vise 10 previously described is provided as part of a kit 40 that may include at least one instrument 38 and/or dental crowns 36. Instrument 38 may be, for example, crown scissors, contouring pliers, crimping pliers, but also dental burs or polishing tools to name a few examples. In a particular embodiment, kit 40 includes handheld vice 10, multiple crowns 36, and one or more instrument 38.

The method of shaping a dental crown, shown in FIG. 3B, includes gripping an elongate handle 20 extending from a bottom surface 18 of a vise block 12 of the handheld vise 10. A crown 36 is placed between a first jaw 26 and second jaw 28 of the handheld vise 10 such that a top occlusal surface 36a of the crown 36 faces towards a top surface 14 of the vise block of the handheld vise 10, and a base 36b of the crown faces away from the handheld vise 10. The crown 36 is secured between the first jaw 26 and second jaw 28 by using means 24 for rotating a linear screw 22 (see FIGS. 1A-B) embedded in the vise block 12 thereby moving the second jaw 28 until the crown 36 is securely held between the second jaw 28 and the first jaw 26. Material 36m is removed from the base 36b of the crown using instrument 38 to form a prepared crown. Advantageously, through the use of the handheld vise 10, a dental practitioner can trim the crown using instrument 38 in one hand, while rotating handheld vise 10 using the other hand to thereby rotate the crown 36 that is held in vise 10 while continuing to trim the crown around its perimeter.

The method illustrated in FIG. 3B, provides for trimming of the crown in order to expose the cervical margin of a tooth when the dental crown is placed on an insertion site in the mouth of a patient. Exposing the cervical margin of a tooth may be necessary for reasons such as ensuring proper fit, proper retention of the crown on the tooth, and gingival health. If a crown extends too far subgingivally (below the gumline), the crown could irritate the gums and lead to inflammation, discomfort and potential gum recession. Trimming the crown in some cases helps adapt the crown to the exact shape of the prepared tooth, ensuring a snug, retentive fit. A crown that is too long may move, be loose, or fail to seat properly, reducing durability and increasing risk of failure. The handheld vise disclosed herein provides a quick, consistent and reliable way to aid in the trimming and shaping of dental crowns, such as those often used in pediatric dentistry.

It is to be understood that the handheld vise for dental crowns is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of shaping dental crowns using a handheld vise, the method comprising:

providing the handheld vise, wherein the handheld vise comprises a vise block having an upper surface, side surfaces, and a bottom surface;

gripping an elongate handle extending from the bottom surface of the vise block of the handheld vise;

placing a crown between first and second jaws on the upper surface of the handheld vise such that a top occlusal surface of the crown faces towards a top surface of the vise block of the handheld vise, and a bottom surface of the crown faces away from the handheld vise;

securing the crown between the first and second jaws by rotating a linear screw embedded in the vise block thereby moving the second jaw until the crown is securely held between the second jaw and the first jaw, wherein the first jaw has a first contact surface with a smooth planar contour, wherein the second jaw is movable on the upper surface of the vise block and is coupled to the linear screw such that the second jaw moves axially over the linear screw upon rotation of the linear screw, and wherein a second contact surface of the second jaw is smooth and arcuately contoured for gripping the crown between the first and second contact surfaces, and wherein the second jaw is flexible, the second jaw adapting to contours of the crown when gripping the crown in a secured position between the first jaw and the second jaw; and removing material from a base of the crown using cutting or shaping instruments to form a prepared crown.

2. The method of shaping dental crowns using a handheld vise of claim 1, wherein the crown is a stainless-steel crown.

\* \* \* \* \*